US011609660B2

(12) United States Patent
Lee et al.

(10) Patent No.: US 11,609,660 B2
(45) Date of Patent: Mar. 21, 2023

(54) ELECTRONIC DEVICE INCLUDING FLEXIBLE DISPLAY AND METHOD USING THE SAME

(71) Applicant: Samsung Electronics Co., Ltd., Gyeonggi-do (KR)

(72) Inventors: Jookwan Lee, Gyeonggi-do (KR); Yongjin Kwon, Gyeonggi-do (KR); Hyunju Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/539,428

(22) Filed: Dec. 1, 2021

(65) Prior Publication Data

US 2022/0147180 A1    May 12, 2022

Related U.S. Application Data

(63) Continuation of application No. PCT/KR2021/016360, filed on Nov. 10, 2021.

(30) Foreign Application Priority Data

Nov. 11, 2020 (KR) .................. 10-2020-0150563
Dec. 10, 2020 (KR) .................. 10-2020-0172713

(51) Int. Cl.
*G06F 3/041* (2006.01)
*G06F 1/16* (2006.01)

(52) U.S. Cl.
CPC .......... *G06F 3/0418* (2013.01); *G06F 1/1652* (2013.01)

(58) Field of Classification Search
CPC ............. G06F 1/1624; G06F 1/1652; G06F 2203/04102; G09F 9/301; G09G 2380/02
See application file for complete search history.

(56) References Cited

U.S. PATENT DOCUMENTS 10,452,156 B2 * 10/2019 Kang .................... G06F 3/0488
2009/0051830 A1 * 2/2009 Matsushita ........... G06F 1/1652
361/679.05

(Continued)

FOREIGN PATENT DOCUMENTS

JP    5295839 B2    9/2013
JP    6625742 B2    12/2019

(Continued)

OTHER PUBLICATIONS

International Search Report dated Feb. 14, 2022.
Written Opinion dated Feb. 14, 2022.

*Primary Examiner* — Joe H Cheng
(74) *Attorney, Agent, or Firm* — Cha & Reiter, LLC

(57) ABSTRACT

According to certain embodiments, an electronic device, comprises a sensor module; a flexible display; and a processor operatively connected to the sensor module and the flexible display, wherein the processor is configured to: measure a first position of the flexible display using the sensor module, thereby resulting in a measured first position value, measure a second position of the flexible display using the sensor module based on a movement of the flexible display, thereby resulting in a measured second position value, determine a change amount in movement of the flexible display using the measured first position value and a measured second position value, thereby resulting in a determined movement change, correct the measured second position value using a threshold based on the determined movement change amount of the flexible display, thereby resulting in a corrected second position value, and display a screen based on the corrected second position value.

20 Claims, 13 Drawing Sheets

(56) References Cited

U.S. PATENT DOCUMENTS

| | | | |
|---|---|---|---|
| 2013/0127918 A1 | 5/2013 | Kang et al. | |
| 2013/0314387 A1 | 11/2013 | Kwack et al. | |
| 2014/0137041 A1 | 5/2014 | Jeon et al. | |
| 2014/0218375 A1 | 8/2014 | Kim | |
| 2014/0380186 A1 | 12/2014 | Kim et al. | |
| 2017/0011714 A1* | 1/2017 | Eim | G06F 3/0362 |
| 2017/0061932 A1* | 3/2017 | Kwon | G06F 3/0487 |
| 2017/0308346 A1 | 10/2017 | Lee et al. | |
| 2018/0018073 A1 | 1/2018 | LeMay et al. | |
| 2018/0364827 A1* | 12/2018 | Chung | G06F 1/1643 |
| 2019/0146558 A1 | 5/2019 | Ohata et al. | |
| 2019/0261519 A1 | 8/2019 | Park et al. | |
| 2019/0346954 A1 | 11/2019 | Jung et al. | |

FOREIGN PATENT DOCUMENTS

| | | |
|---|---|---|
| KR | 10-2013-0056674 A | 5/2013 |
| KR | 10-2014-0100149 A | 8/2014 |
| KR | 10-2014-0147497 A | 12/2014 |
| KR | 10-1903743 B1 | 9/2018 |
| KR | 10-2019-0101184 A | 8/2019 |
| KR | 10-2019-0109570 A1 | 9/2019 |
| KR | 10-2019-0128843 A | 11/2019 |
| KR | 10-2107134 B1 | 4/2020 |
| WO | WO-2020082203 A1 * | 4/2020 |

\* cited by examiner (a)

(b)

ELECTRONIC DEVICE INCLUDING FLEXIBLE DISPLAY AND METHOD USING THE SAME

CROSS-REFERENCE TO RELATED APPLICATION(S)

This application is a continuation of International Application No. PCT/KR2021/016360, filed on Nov. 10, 2021 which is based on and claims priority under 35 U.S.C. § 119 to Korean Patent Applications No. 10-2020-0150563 filed on Nov. 11, 2020 and Korean Patent Application No. 10-2020-0172713 filed on Dec. 10, 2020, in the Korean Intellectual Property Office, the disclosure of which is incorporated by reference herein in its entirety.

TECHNICAL FIELD

The disclosure relates to an electronic device including a flexible display and a method of using the same, and more particularly, to a method of determining a display area according to expansion or reduction of the flexible display and an electronic device using the same.

BACKGROUND ART

Electronic devices are gradually becoming thinner and while maintaining sufficient rigidity to avoid breaking. These electronic devices are gradually being transformed into various shapes, as opposed to just a rectangular shape. A common problem with electronic devices that are portable is the size of the screen. In order to keep the electronic device portable, the dimensions of the device should correspond to the size of packet. This restricts the size of the display. However, a flexible display (foldable, slidable, bendable) allows the user to have a larger screen while maintaining the portability of the electronic device. When the user is using the electronic device, the flexible display can have the larger size. When the user is not using the display and is, for example, wants to carry the electronic device on their person, the user can minimize the size of the display.

SUMMARY

As a size of a flexible display is variously changed, a display area exposed to the outside may not match a display area in which contents are to be displayed. In certain embodiments of the disclosure, it is possible to reduce an error between a display area exposed to the outside and a display area in which contents are to be displayed.

According to certain embodiments, an electronic device, comprises a sensor module; a flexible display; and a processor operatively connected to the sensor module and the flexible display, wherein the processor is configured to: measure a first position of the flexible display using the sensor module, thereby resulting in a measured first position value, measure a second position of the flexible display using the sensor module based on a movement of the flexible display, thereby resulting in a measured second position value, determine a change amount in movement of the flexible display using the measured first position value and a measured second position value, thereby resulting in a determined movement change, correct the measured second position value using a threshold based on the determined movement change amount of the flexible display, thereby resulting in a corrected second position value, and display a screen based on the corrected second position value.

In certain embodiments, a method of operating an electronic device comprises: measuring a first position of a flexible display using a sensor module, thereby resulting in a measured first position value; measuring a second position of the flexible display using the sensor module based on a movement of the flexible display, thereby resulting in a measured second position value; determining a movement change amount of the flexible display using the measured first position value and a measured second position value, thereby resulting in a determine movement change; correcting the measured second position value using a threshold based on the determined movement change amount of the flexible display, thereby resulting in a corrected second position value, and displaying a screen based on the corrected second position value.

According to certain embodiments of the disclosure, even when a size of a flexible display is being variously changed, a display area exposed to the outside and a display area in which contents are to be displayed can match.

DETAILED DESCRIPTION

The following description describes a number of different embodiments. It shall be understood that statements that are made about one embodiment, are not necessarily true about all embodiments described herein, as well as embodiments falling within the scope of the claims.

Figure 1:
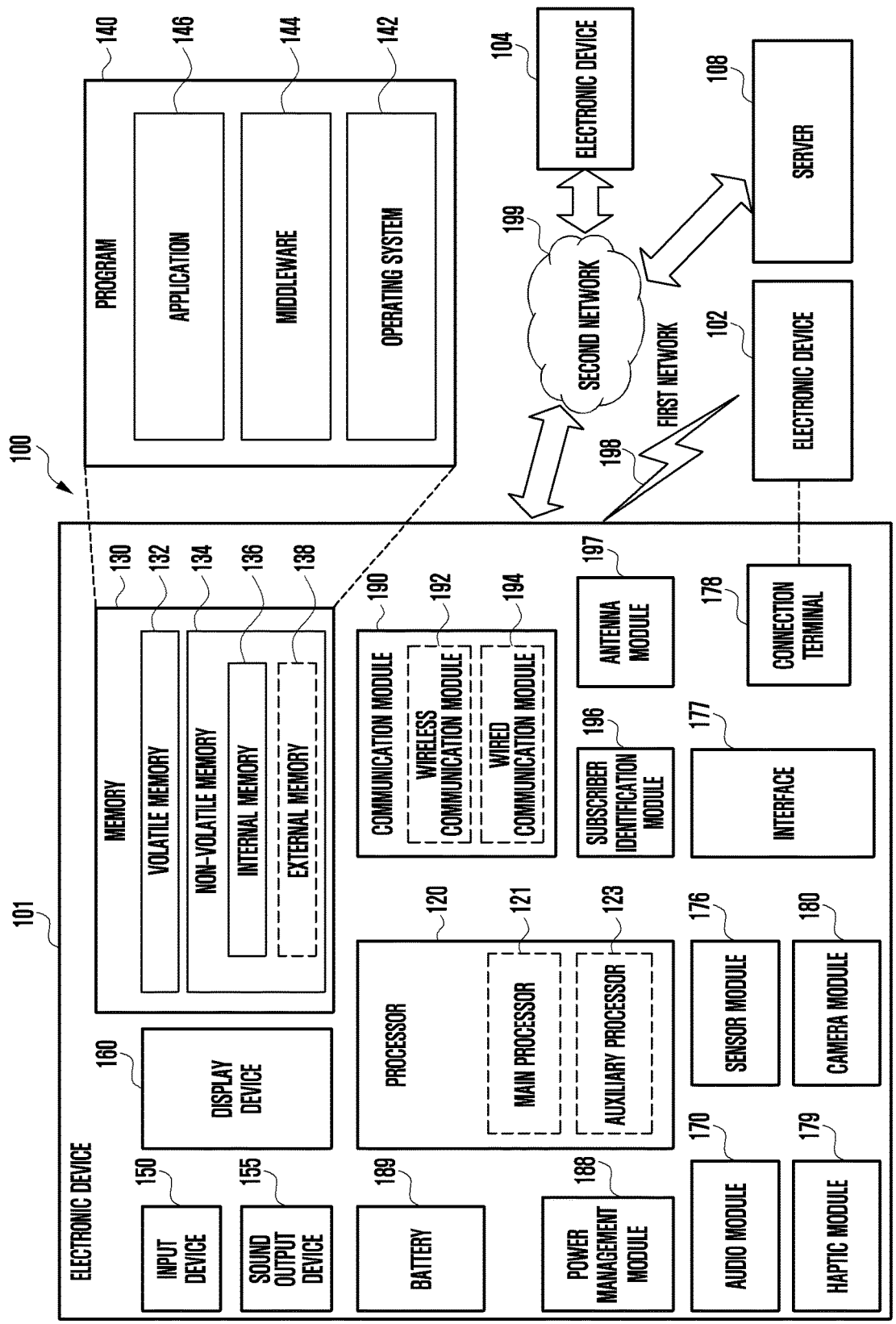
FIG. 1 is a block diagram illustrating an electronic device in a network environment according to certain embodiments.

An electronic device 101 can have a flexible display. When the size of the flexible display is changed, the display area for the contents continues to match the changed size of the flexible display. FIG. 1 describes functional modules that may exist in an electronic device 101.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123. The auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. The mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT-related technology.

In order to keep the electronic device 101 portable while allowing the user to enjoy a larger display, display device 180 can comprises a flexible display. When the user is using the electronic device, the flexible display can have the larger size. When the user is not using the display and is, for example, wants to carry the electronic device on their person, the user can minimize the size of the display.

When processor 120 executes the programs 140, the processor 120 may output certain content to be displayed on the display device 180. The processor 120 can spatially map the output content to a display area. When the size of the display device 180 is changed, the display area for the contents continues to match the changed size of the display device 180.

Figure 2:
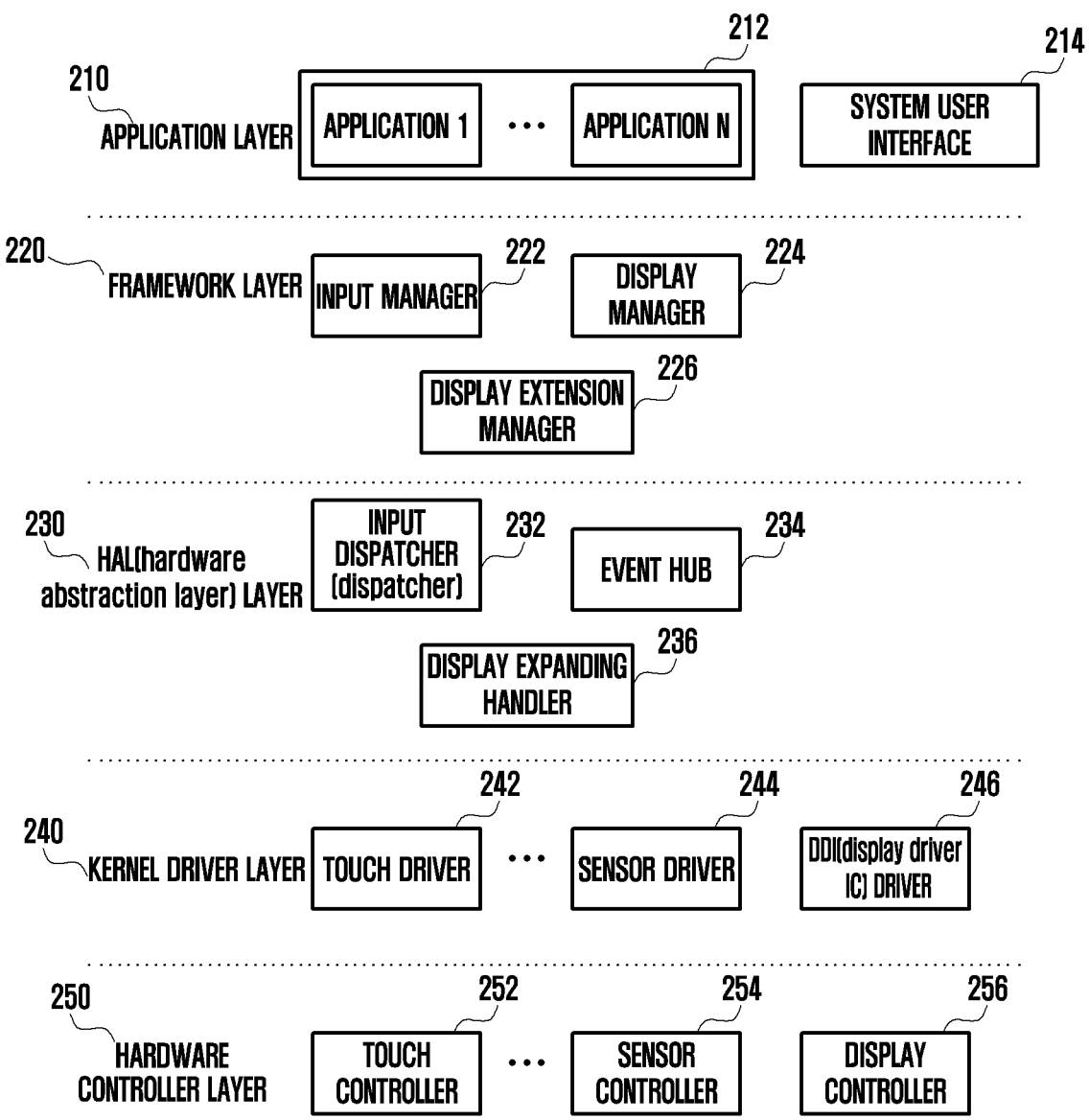
FIG. 2 is a hierarchy diagram illustrating a software module according to certain embodiments.

FIG. 2 is a hierarchy diagram illustrating a software module according to certain embodiments. It shall be understood that each of the elements are stored in memory, and the spatial depictions in the drawings are used to illustrate the functional relationships between the elements.

A layer of the software module may include an application layer 210, a framework layer 220, a hardware abstraction layer (HAL) layer 230, a kernel driver layer 240, and a hardware controller layer 250.

The application layer 210 may include an application 212 and a system user interface 214. The application 212 may include, for example, home, dialer, SMS/MMS, instant message (IM), browser, camera, alarm, contact, voice recognition, email, calendar, media player, album, watch, health (e.g., measuring biometric information such as exercise amount or blood sugar), or environmental information (e.g., measuring atmospheric pressure, humidity, or temperature information) applications. The application 212 may further include an information exchange application capable of supporting information exchange between an electronic device (e.g., the electronic device 101 of FIG. 1) and an external electronic device. The system user interface 214 may include a user interface for configuring the electronic device 101.

The framework layer 220 may include an input manager 222, a display manager 224, and a display extension manager 226. The input manager 222 may manage information on an input device (e.g., the input module 150 of FIG. 1). The input manager 222 may configure, for example, display viewport information for interpreting input event coordinates. The display manager 224 may manage a life cycle (e.g., connection, attribute change, and removal) of a display (e.g., the display module 160 of FIG. 1). The display manager 224 may map a logical display for outputting a graphic user interface (GUI) element (e.g., window) to a physical display. The display manager 224 may receive information on a size of the logical display changed by a display extension event from the display extension manager 226 to apply the size information. The display expansion manager 226 may analyze one or more sensor events to determine a current expansion state (e.g., expansion/reduction) of the display, calculate a size thereof, and provide changed information to each module that needs changed information.

The HAL layer 230 may include an input dispatcher 232, an event hub 234, and a display expanding handler 236. The input dispatcher 232 may distribute and/or transfer an input event to an event reception target module. The event hub 234 may read data of events received from a hardware input device such as a touch driver 242 and a sensor driver 244, and convert the data into raw input events. The display expanding handler 236 may receive measured values from various sensors in order to measure the sliding degree of the display, such as a touch screen panel (TSP) and a hall-IC, correct an error using a threshold, and determine a sliding direction using the measured value. The display expanding handler 236 may adjust a size of a threshold in consideration of the sliding direction.

The kernel driver layer 240 may include various drivers for controlling various hardware modules included in the electronic device. The kernel driver layer 240 may include a touch driver 242, a sensor driver 244, and a display driver IC (DDI) driver 246. The touch driver 242 may receive information from a touch panel to control the touch panel. The sensor driver 244 may receive information from a sensor (e.g., TSP, hall-IC) or control the sensor. The DDI driver 246 may control the display 160.

The hardware controller layer 250 may mean various types of hardware included in the electronic device. The hardware controller layer 250 may include a touch controller 252 for receiving a user input, generating an interrupter corresponding to the user input, and transmitting the interrupter and information related to the user input to the processor 252, a sensor controller 254 for transmitting information collected by the sensor to the processor, and a display controller 256.

A user interface may be displayed in a partial area of the flexible display by a structure or configuration. For example, when a partial area of the flexible display is inserted into the electronic device, the user interface may not be displayed in the inserted display area. As another example, a user interface may not be displayed in a partial area of the flexible display by a user's configuration.

A partial area of the flexible display may be reduced by being introduced into the electronic device or a partial area of the flexible display inserted into the electronic device may be expanded by being drawn out through a sliding motion.

The flexible display may include, for example, a slide-out display, an expandable display, or a rollable display.

In the disclosure, an area in which the processor displays a user interface among areas of the flexible display may be referred to as a logical display, and as a structure of the flexible display is changed, an area in which a user interface may be displayed in a current state may be referred to as a physical display.

Figure 3:
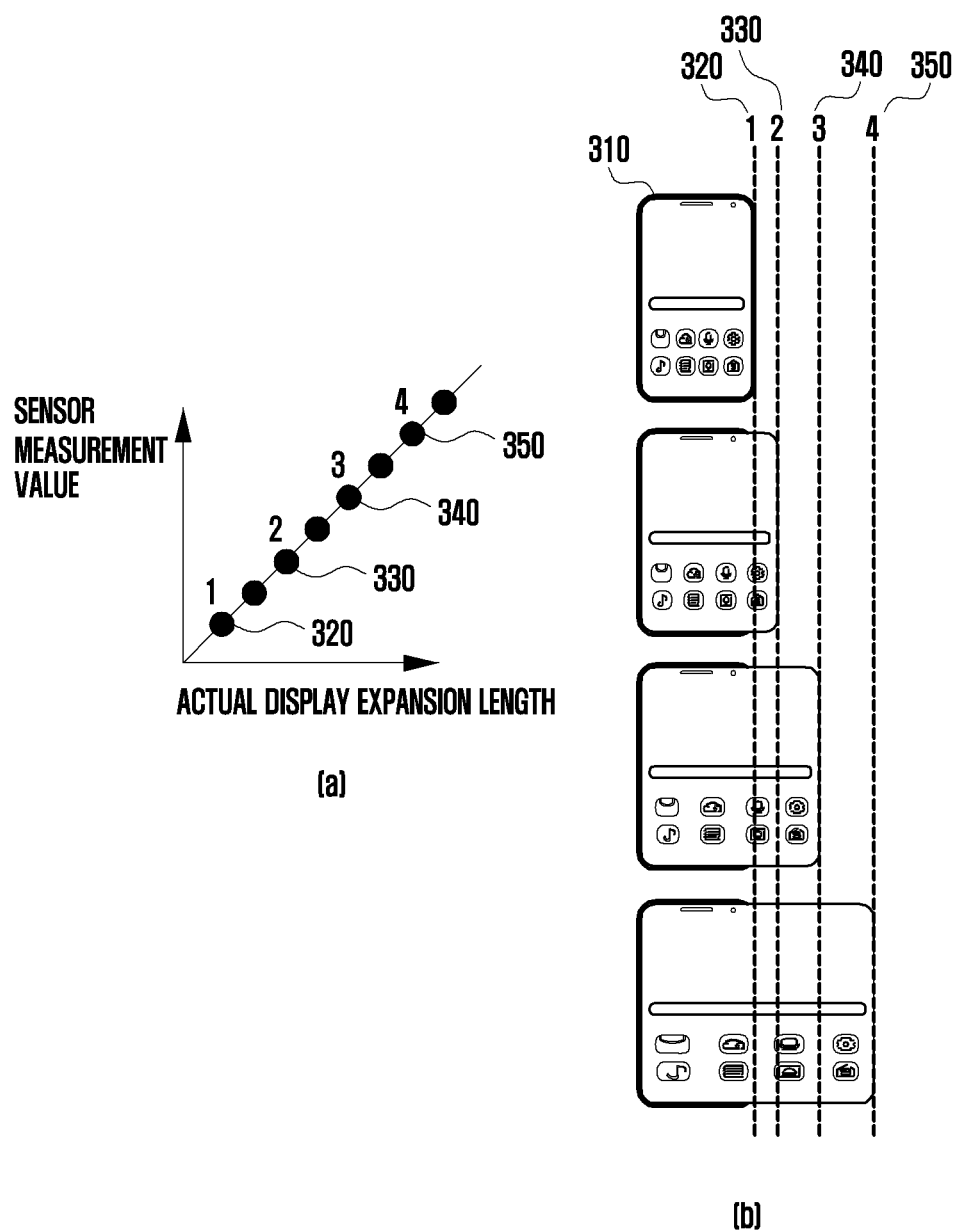
FIGS. 3 and 4 are diagrams illustrating a logical display divided into an ideal case and a realistic case as a physical display is expanded according to certain embodiments.
Figure 4:
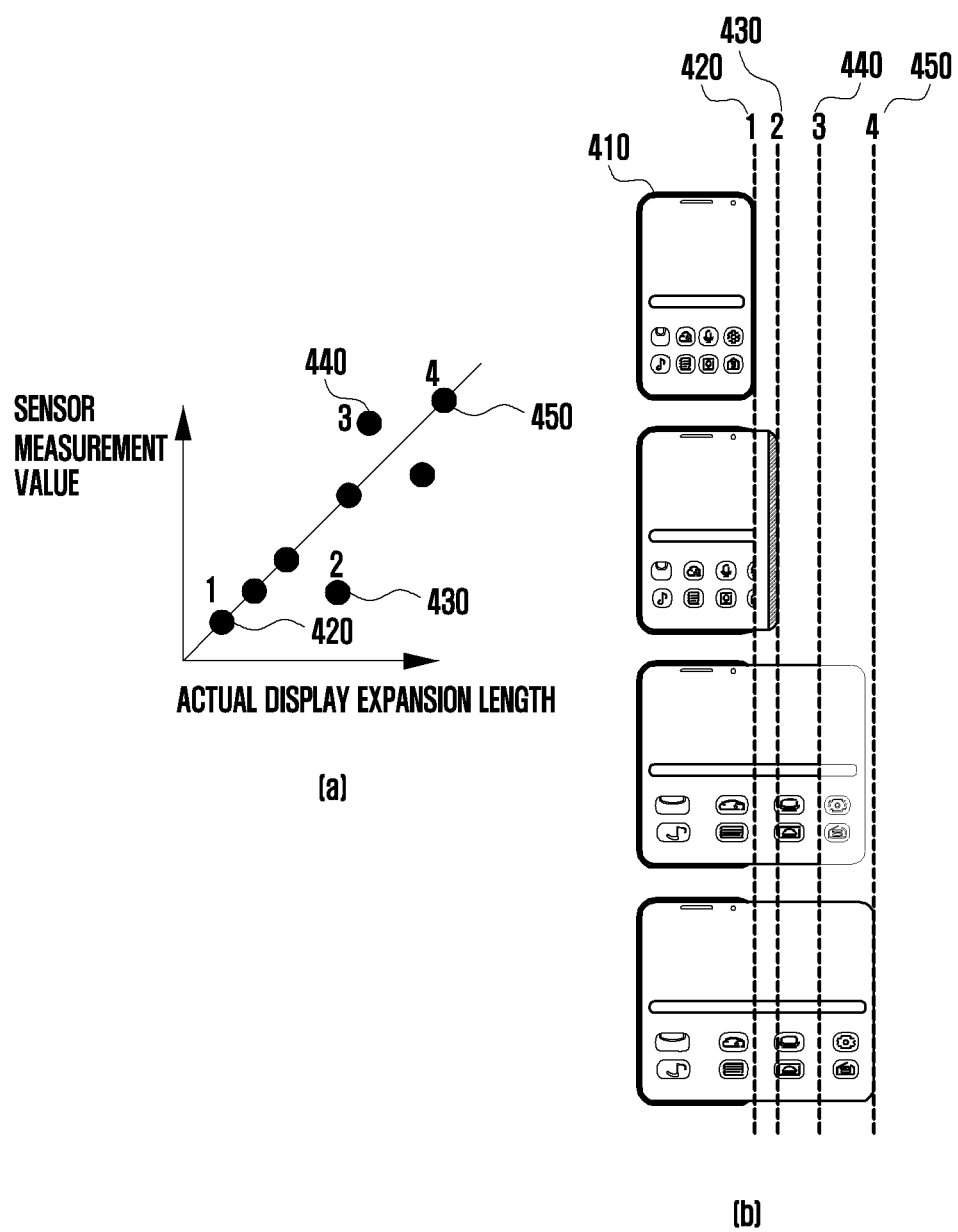

FIGS. 3 and 4 are diagrams illustrating a logical display divided into an ideal case and a realistic case as a physical display is expanded according to certain embodiments.

The display (e.g., the display module 160 of FIG. 1) of the electronic device may be a flexible display (e.g., rollable display). The physical display may indicate, for example, a display in a state in which the flexible display is physically expanded or reduced according to a user input. User input may include manual pulling or pushing, folding unfolding, as well as pressing a physical or virtual button that may activate an electromechanical motor. As the physical display is expanded or reduced, the logical display capable of displaying the user interface may be also expanded or reduced.

An electronic device 310 (e.g., the electronic device 101 of FIG. 1) may include a sensor module (e.g., the sensor module 176 of FIG. 1) to determine a degree in which the display 160 is reduced or expanded. The sensor module 176 may include, for example, at least one of a contact sensor such as a touch sensor, an infrared ray (IR) sensor, a time of flight (TF) sensor, a non-contact sensor, or a magnetic force sensor. The non-contact sensor may use an electromagnetic induction method, a capacitive method, a resistive method, or the like. The electronic device 310 may determine expansion/reduction of the display 160 and a degree thereof using a sensor measurement value measured using the sensor module 176. The sensor measurement value may include an error according to mounting of a component, an error according to a physical characteristic, and/or an error according to an external environmental change by a user. Due to such an error, the size of the physical display derived using the sensor measurement value may not match the size of the actual physical display.

FIG. 3A is a graph illustrating a size of an actual physical display and a size of the physical display derived using the sensor measurement value in an ideal case, and FIG. 3B illustrates a logical display as the size of the actual physical display is changed from 320 to 350.

In FIG. 3B, the physical display is expanded to the size of the left border of the electronic device 310 to lines 320, 330, 340, and 350. It can be seen, in FIG. 3A, that when the size of the physical display as measured by sensors (vertical axis) is equal to the actual display extension length (horizontal axis). Because the size of the physical display derived using the sensor measurement value matches the size of the actual physical display, the user interface displayed on the logical display may be displayed without being cropped or lacking.

FIG. 4A illustrates a size of the physical display derived using the sensor measurement value and a size of the actual physical display in a realistic case, and FIG. 4B illustrates a logical display as the size of the actual physical display is changed from 420 to 450. For example, when the size of the actual physical display is changed from 420 to 430, the size of the physical display derived using the sensor measurement value may be smaller than that of the actual physical display. As a result, the user interface may be displayed only on a part of the actual physical display. A portion on the right of the display may be unused. As another example, when the size of the actual physical display is changed from 430 to 440, the size of the physical display derived using the sensor measurement value may be larger than that of the actual physical display. In this case, only a part of the user interface may be displayed in the part of the actual physical display, causing the right portion of the user interface (drawn faintly) to be cropped.

Figure 5:
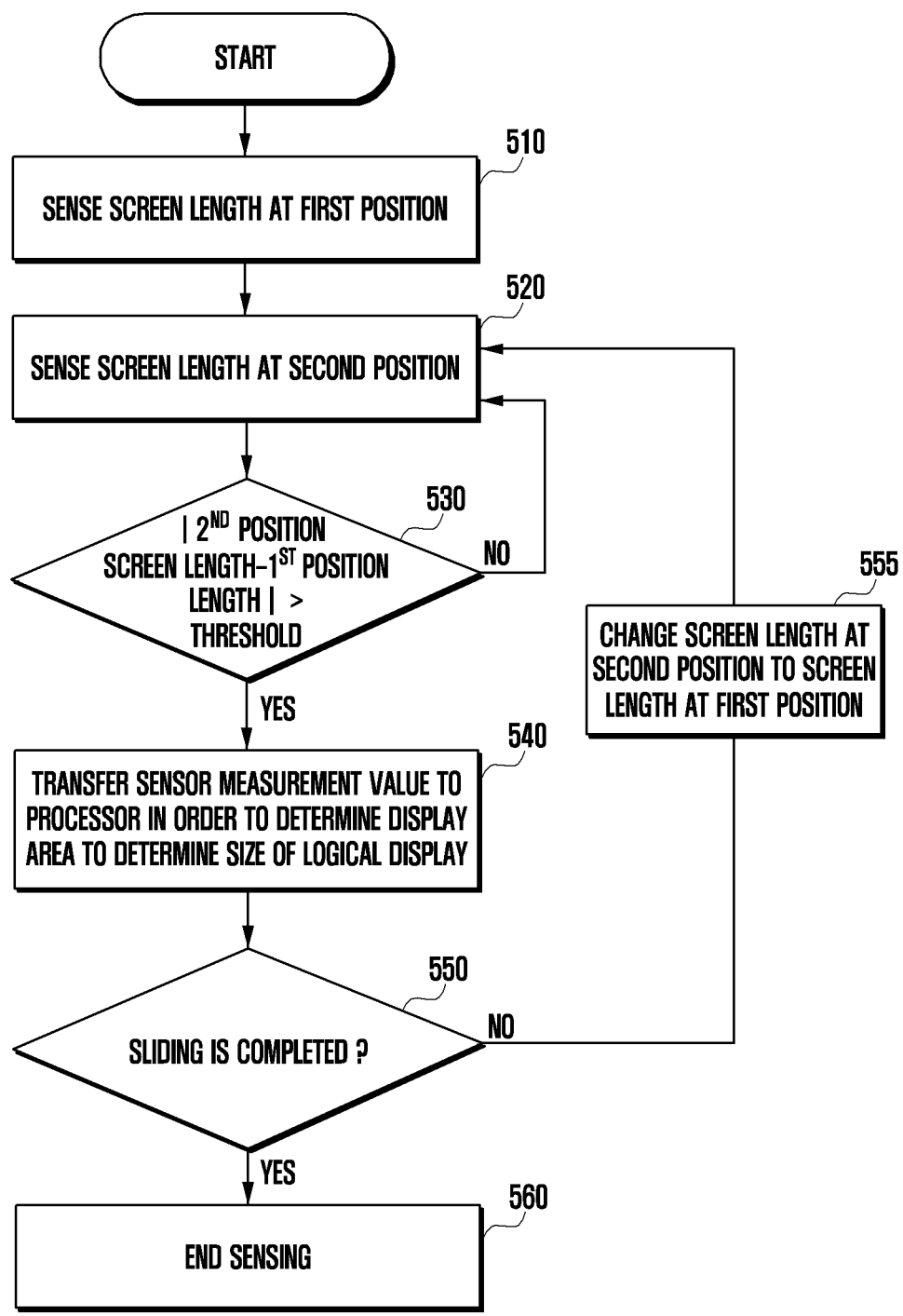
FIG. 5 is a flowchart correcting an error value of a sensor measurement value according to certain embodiments.

To prevent the foregoing, the size of the physical display as measured by sensors can be compensated using a threshold. The threshold can be adjusted based on previous changes in display size. FIG. 5 is a flowchart correcting an error value of a sensor measurement value according to certain embodiments.

According to an embodiment, in operation 510, the electronic device may measure a screen length at a first position using a sensor module. In order to distinguish the display length measured in operation 510 from a display length measured during operation 520, the display length measured in operation 510 may be referred to as a "first position screen length."

In operation 520, the electronic device 101 may measure the changed length of the display 160. For example, when a change in the length of the display 160 is detected, the electronic device 101 may measure a screen length at a second position of the display 160 (a second position screen length). As another example, the electronic device 101 may measure a length of the display 160 visible to the outside periodically or after a predetermined time period has elapsed.

In operation 530, the electronic device 101 may identify whether the screen length at the second position of the display 160 measured in operation 520 deviates by greater than a threshold than the screen length at the first position of the display 160 measured in operation 510. Operation 530 may be an operation in which the electronic device 101 determines whether to update the logical display.

If the second position screen length of the display 160 measured in operation 520 deviates by more than a minimum threshold from the first position of the display 160 measured in operation 510, the electronic device 101 may transfer a sensor measurement value to the processor in order to determine a display area to determine a size of the logical display in operation 540. The electronic device 101 may correct second position screen length measured in operation 520. The electronic device 101 may correct the second position screen length using a look-up table. For example, the electronic device 101 may correct the second position screen length by setting it to the first position screen length plus or minus the threshold. According to certain embodiments, operation 540 may be processed by a module for processing display information in the processor, for example, the display extension manager of the framework layer.

If the screen length at the second position of the display 160 measured in operation 520 deviates by less than the minimum threshold than the screen length at the first position of the display 160 measured in operation 510, the electronic device 101 may again perform operation 520.

In certain embodiments, the condition of operation 530 can be based on whether the second position screen length exceeds the first position screen length by the minimum threshold.

In operation 550, the electronic device 101 may determine whether a movement of the display 160 is completed. For example, when a movement of the display 160 is performed within a predetermined range for a predetermined time period, the electronic device 101 may determine that sliding is completed.

If a movement of the display 160 is completed, the electronic device 101 may end measuring the length of the display 160 in operation 560.

If a movement of the display 160 is not completed, the electronic device 101 may change a screen length at the second position to a screen length at the first position in operation 555 and perform again operation 520.

A change amount in movement of the display at a time point n may be represented as follows.

$$dX_n = X_n - X_{n-1}$$

where $X_n$ represents a length of the display at a time point n, and $X_{n-1}$ represents a length of the display at a time point n−1. If $dX_n$ is greater than 0, it may indicate expanding the display, and if $dX_n$ is smaller than 0, it may indicate shrinking the display. Expanding the device can be associated with a movement in one moving direction, while shrinking the device can be associated with movement of the device in a second moving direction that is opposite to the first moving direction. A moving direction of the display may be one-dimension or two-dimension.

The electronic device may process a display sliding event differently according to a threshold.

A minimum threshold $X_{th,min}$, may be a reference value that does not need to update the logical display because a length of the display 160 is slightly changed. The minimum threshold may be a reference value determined as an error value of a sensor measurement value. A maximum threshold $X_{th,max}$ has a value smaller than that of an area of the entire display and may be a reference value for preventing a sudden change of the logical display due to a large movement from a current position or an error of an excessively large sensor measurement value. The maximum threshold may estimate a movement direction through a movement change amount of the display and change in real time using this. The minimum and maximum thresholds may be determined by at least one of a sensor type, a sensor method, sensor sensitivity, a sensor specification, a display size, a battery capacity, a user setting, an experimental result, or a resolution.

For example, when the display physically continues to expand, if it is described in units of pixels, the initially set maximum threshold is 8 pixels, and when the display is expanded along the X-axis and a change amount in movement of the display becomes greater than a predetermined value, the maximum threshold may be increased to 16 pixels increased to the double. As another example, when the expansion of the display begins to slow down, if the change amount in movement of the display is smaller than a predetermined value, the maximum threshold may be reduced from 16 pixels to 8 pixels. The minimum threshold may increase or decrease similarly to the maximum threshold. Here, it is represented as an amount of a movement change, but a movement speed may be compared with a constant value.

In certain embodiments, −dx can be used when the device is being shrunk. For example, when the display physically shrinks, if it is described in units of pixels, the initially set $X_{th,max}=8$ pixels, and when the display is shrunk along the X-axis and a change amount in movement of the display (−dx) becomes greater than a predetermined value, the maximum threshold may be increased to $X_{th,max}=16$ pixels.

In other embodiments, abs(dx) can be used for both expansion and shrinking of the display size.

Figure 6:
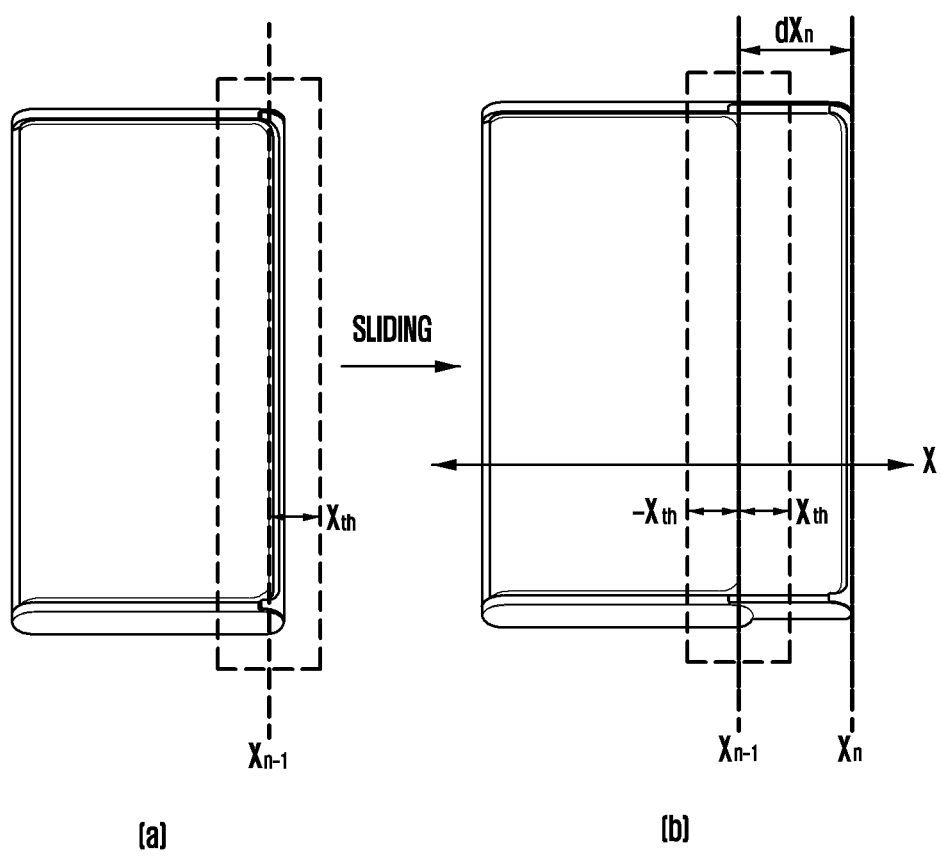
FIG. 6 is a diagram illustrating a threshold according to sliding of a display according to certain embodiments.

FIG. 6 is a diagram illustrating a threshold according to sliding of a display according to certain embodiments.

FIG. 6A illustrates a position and threshold of the display at a time point n−1. Referring to FIG. 6A, the display may be positioned at $X_{n-1}$ at a time point n−1. Because the display may be expanded or reduced, the threshold may be represented as $\pm X_{th}$ based on $X_n$.

FIG. 6B illustrates a position and threshold of the display at a time point n. The display may be expanded by sliding between a time point n−1 and a time point n. Referring to FIG. 6B, the display may be moved more than a threshold to be positioned at a time point $X_n$ at a time point n. A moving distance $dX_n$ of the display between the time point n−1 and the time point n may be represented as $X_n - X_{n-1}$.

Figure 7:
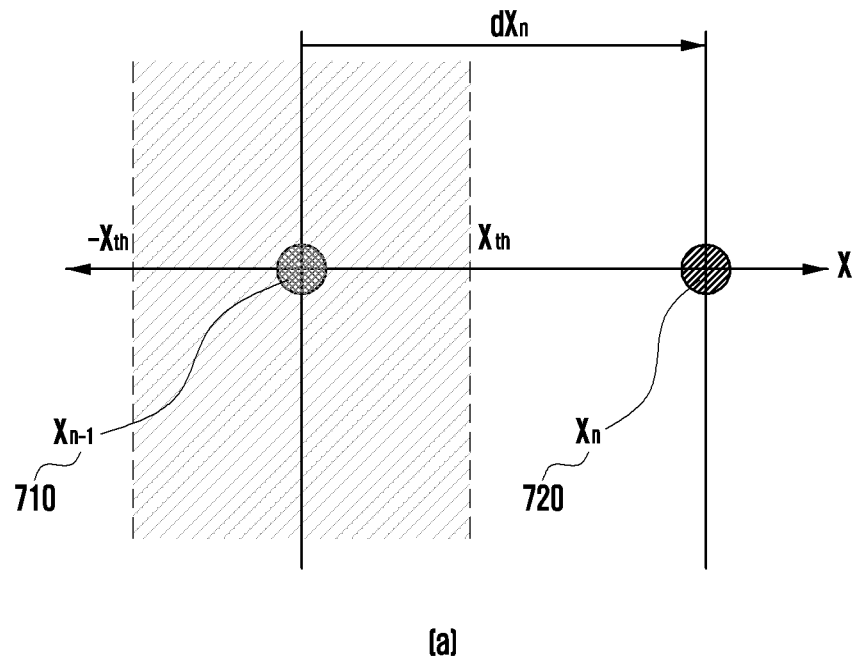
FIG. 7 is a diagram illustrating a movement distance on an X-axis of a display differently processed according to certain embodiments.
Figure 7:
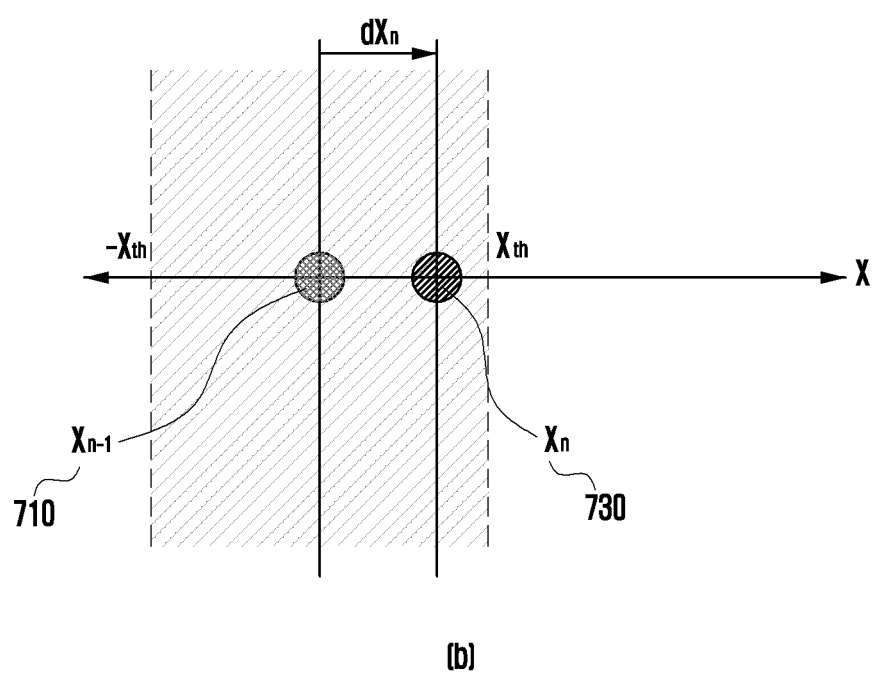

FIG. 7 is a diagram illustrating a movement distance on an X-axis of a display differently processed according to certain embodiments.

According to an embodiment, FIG. 7A illustrates a case determined as Yes in operation 530 of FIG. 5, and FIG. 7B illustrates a case determined as No in operation 530 of FIG. 5.

Referring to FIG. 7A, the display may be positioned at $X_{n-1}$, 710 at a time point n−1. Thereafter, the display may move and be positioned at $X_n$, 720 at a time point n. Because a distance $dX_n$ moved by the display between the time point n−1 and the time point n is greater than the threshold, the electronic device may correct a sensing error value to determine a size of the logical display. That is, when a change amount in movement of the display increases, the sensing error value may also be corrected by reflecting the change amount in movement of the display. In order to reflect the determined size of the logical display, the electronic device may update the logical display. FIG. 7A illustrates that the electronic device determines to Yes in operation 530 of FIG. 5 and performs operation 540.

Referring to FIG. 7B, the display may be positioned at $X_{n-1}$, 710 at a time point n−1. Thereafter, the display may move and be positioned at $X_n$, 730 at a time point n. A distance $dX_n$ moved by the display between the time point n−1 and the time point n may be smaller than the threshold. If the distance $dX_n$ moved by the display is smaller than the threshold, the electronic device may determine that the display has not moved and may not update the logical display.

Figure 8:
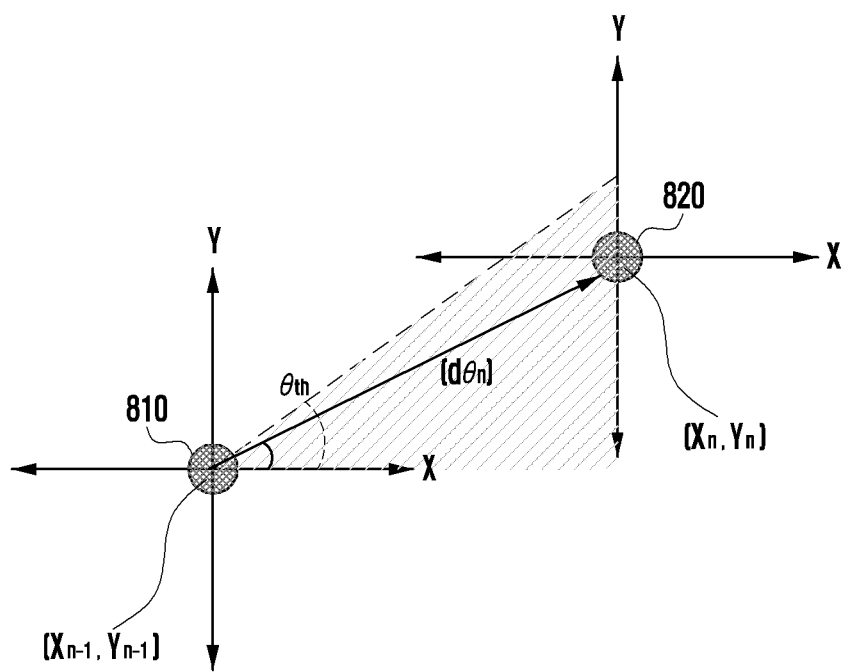
FIG. 8 is a diagram illustrating an example in which a display moves in two dimensions according to certain embodiments.

FIG. 8 is a diagram illustrating an example in which a display moves in two dimensions according to certain embodiments.

When the display moves in two dimensions, the threshold may be determined based on an angle. For example, a case in which the display moves in two dimensions may mean a case in which the display moves both up/down and left/right.

Referring to FIG. 8, the display may be positioned at $X_{n-1}, Y_{n-1}$, 810 at a time point n−1. Thereafter, the display may move and be positioned at $X_n, Y_n$, 820 at a time point n. The electronic device may determine whether an angle $d\theta_n$ moved by the display between the time point n−1 and the time point n is greater than the threshold $\theta_{th}$. If an angle $d\theta_n$ moved by the display is greater than the threshold $\theta_{th}$, the electronic device may correct a sensing error value to determine a size of the logical display, and update the logical display in order to reflect the determined size of the logical display. If an angle $d\theta_n$ moved by the display is smaller than the threshold $\theta_{th}$, the electronic device may determine that the display has not moved and may not update the logical display.

Figure 9:
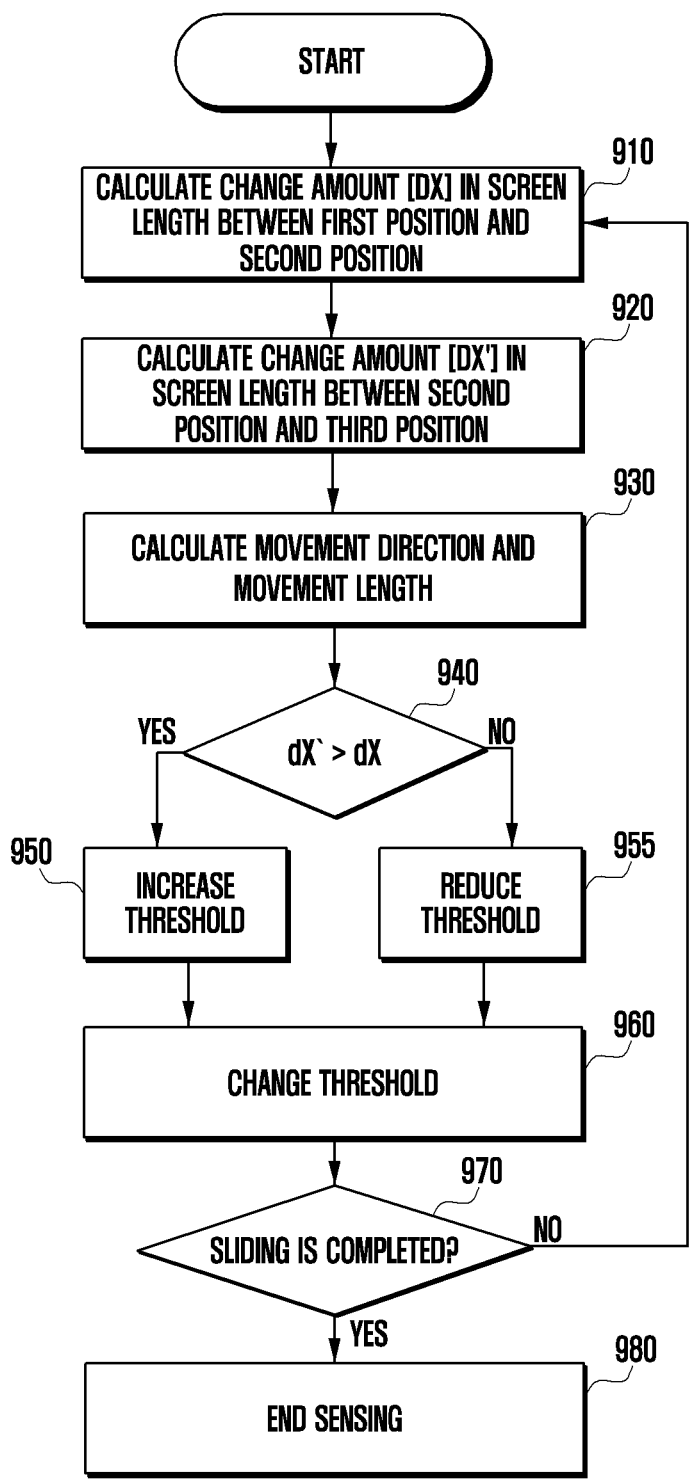
FIG. 9 is a flowchart changing a threshold according to a movement of a display according to certain embodiments.

FIG. 9 is a flowchart changing a threshold according to a movement of a display according to certain embodiments.

According to an embodiment, in operation 910, the electronic device (e.g., the electronic device 101 of FIG. 1) may measure a first position of the display (e.g., the display module 160 of FIG. 1) at a time point n−1 and measure a second position of the display 160 at a time point n to calculate a change amount dX in a display length.

In operation 920, the electronic device 101 may measure a third position of the display 160 at a time point n+1 to calculate a change amount dX' in the display length between the time point n and the time point n+1.

In operation 930, the electronic device 101 may calculate a movement direction and movement length of the display using the change amount in the display length calculated in operations 910 and 920. According to certain embodiments, the electronic device 101 may determine the change amount in movement of the display. For example, the electronic device 101 may determine whether the movement change amount of the display gradually decreases or increases, using the movement direction and movement length of the display. Here, it is represented as a movement change amount, but it may also be represented as a movement speed.

In operation 940, the electronic device 101 may determine whether the change amount dX' in the display length calculated in operation 920 is greater than the change amount dX in the display length calculated in operation 910. Where the electronic device 101 is reduced in size, the condition −dX'>−dX can be used.

If the change amount dX' (−dX' in the case of shrinking) of the display length calculated in operation 920 is greater than the change amount dX (−dX in the case of shrinking) of the display length calculated in operation 910, the electronic device 101 may determine that a moving speed gradually increases in a direction in which the display expands to increase the threshold in operation 950.

If the change amount dX' of the display length calculated in operation 920 is smaller than the change amount dX of the display length calculated in operation 910, the electronic device 101 may determine that the display 160 moves in an expanding direction, but that a movement speed thereof is gradually slowed to reduce the threshold in operation 955.

Although an example in which the display moves in an expanding direction has been described above, the above description may also be applied to an example in which the display moves in a reducing direction, or shrinking.

In operation 960, the electronic device 101 may change the threshold according to operation 950 or 955.

In operation 970, the electronic device 101 may determine whether the movement of the display 160 is completed. For example, when the movement of the display 160 is performed within a predetermined range for a predetermined time period, the electronic device 101 may determine that sliding is completed.

If the movement of the display 160 is completed, the electronic device 101 may end measuring the length of the display 160 in operation 980.

If the movement of the display 160 is not completed, the electronic device 101 may perform again operation 910.

The threshold values calculated in the operations of FIG. 9 can be used with FIG. 5. For example, during operations 910 and 920, the position screen lengths of operations 510 and 520 can by calculated. The operations 530 and 540 can use a threshold calculated in operation 960.

Figure 10:
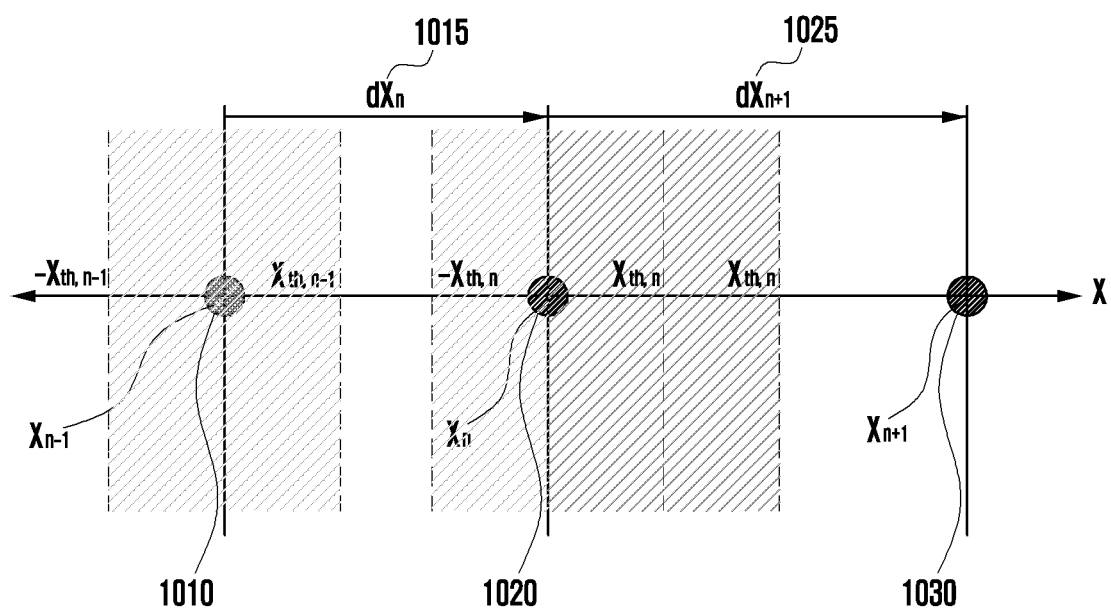
FIG. 10 is a diagram illustrating a movement of a display according to certain embodiments.

FIG. 10 is a diagram illustrating a movement of a display according to certain embodiments.

FIG. 10 is a diagram illustrated to help understanding of FIG. 9. Referring to FIG. 10, the display (e.g., the display module 160 of FIG. 1) may be positioned at $X_{n-1}$, 1010 at a time point n−1, at $X_n$, 1020 at a time point n, and at $X_{n+1}$, 1030 at a time point n+1 on the X-axis.

The electronic device (e.g., the electronic device 101 of FIG. 1) may calculate a movement distance $dX_n$, 1015 of the display 160 between a time point n−1 and a time point n as in operations 910 and 920 of FIG. 9 and a movement distance $dX_{n+1}$, 1025 of the display 160 between the time point n and a time point n+1.

The electronic device 101 may calculate a moving direction and moving distance of the display using the movement distance $dX_n$, 1015 of the display 160 between the time point n−1 and the time point n and the moving distance $dX_{n+1}$, 1025 of the display 160 between the time point n and the time point n+1, as in operation 930 of FIG. 9. Because the movement distance $dX_{n+1}$, 1025 of the display 160 between the time point n and the time point n+1 may be longer than the movement distance $dX_n$, 1015 of the display 160 between the time point n−1 and the time point n, the electronic device (e.g., the electronic device 101 of FIG. 1) may determine to Yes in operation 940 of FIG. 9. The electronic device 101 may increase the threshold according to operations 950 and 960.

Figure 11:
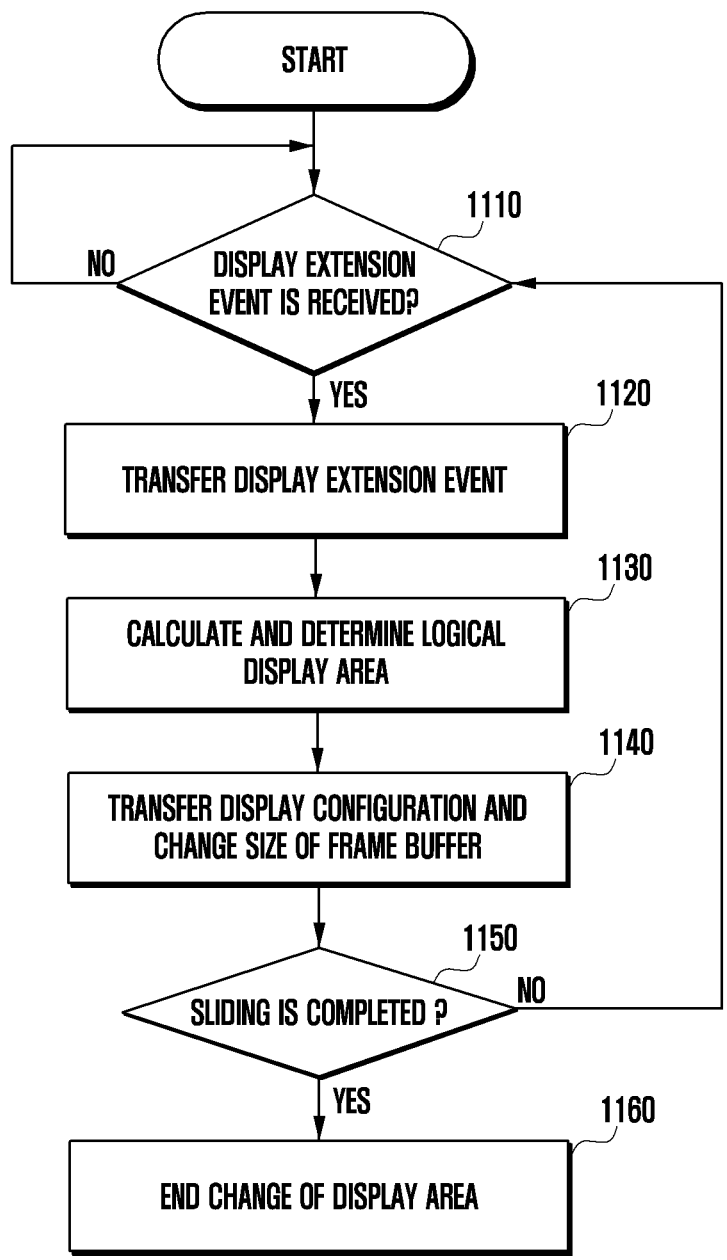
FIG. 11 is a flowchart determining an area of a logical display using a sensor measurement value according to certain embodiments.

FIG. 11 is a flowchart determining an area of a logical display using a sensor measurement value according to certain embodiments.

According to an embodiment, in operation 1110, the processor (e.g., the processor 120 of FIG. 1) of the electronic device (e.g., the electronic device 101 of FIG. 1) may determine whether a display extension event is received. The display expansion event may occur when the display is expanded or when the display is reduced. The display expansion event may occur, for example, when an input for expanding or reducing the display by the user is received.

If the display extension event is received, the processor 120 may transfer the display extension event in operation 1120. The display extension event may be transferred to, for example, a sound output module (e.g., the sound output module 155 of FIG. 1); thus, a sound according to a movement of the display may be output. Operation 1120 is not necessarily performed and may be omitted, if necessary.

In operation 1130, the processor 120 may calculate and determine the logical display area. As the display 160 is expanded or reduced, the logical display area may be changed.

In operation 1140, the processor 120 may transfer a display configuration for the changed logical display area and change a size of the frame buffer.

In certain embodiments, operations 1130-1140 can be performed on the condition that the that during display extension event, the display is expanded in excess of a threshold.

In operation 1150, the processor 120 may determine whether sliding of the display is completed. For example, if the movement of the display is performed within a predetermined range for a predetermined time period, the processor 120 may determine that sliding is completed.

If sliding of the display is completed, the processor 120 may end the change of the display area in operation 1160.

If sliding of the display is not completed, the processor 120 may again perform operation 1110.

Figure 12:
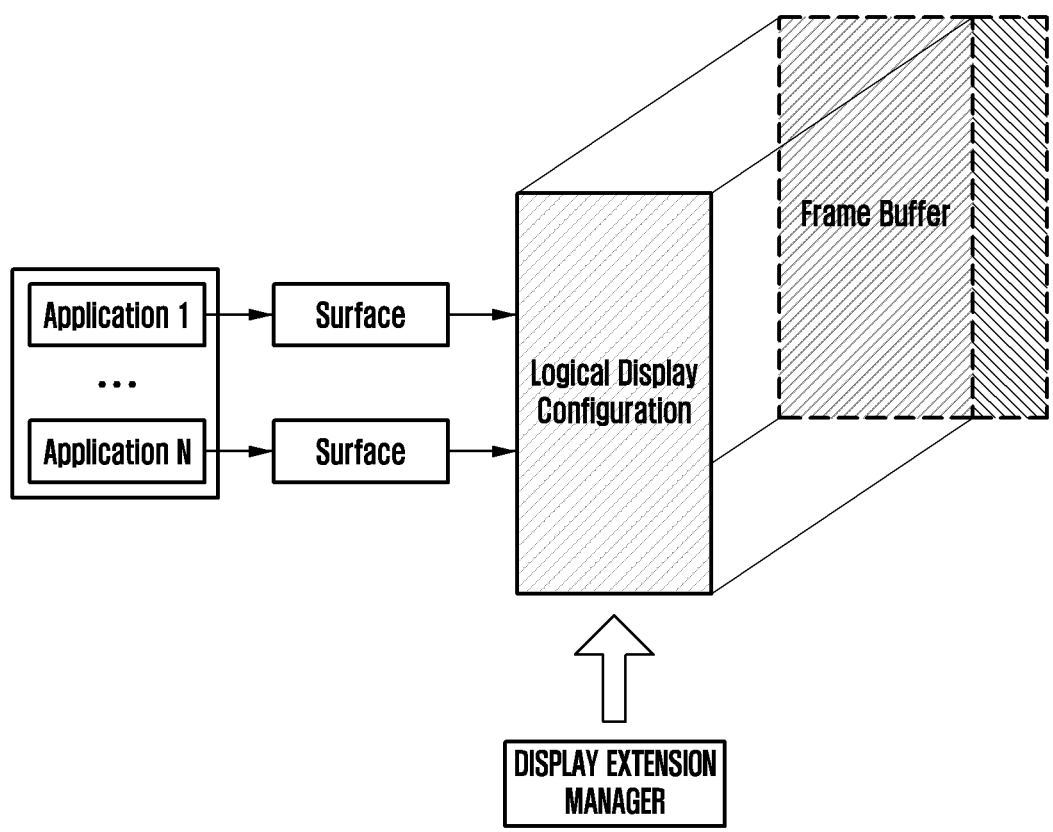
FIGS. 12 and 13 are diagrams illustrating a size of a logical display and a frame buffer area according to sliding of a display according to certain embodiments.
Figure 13:
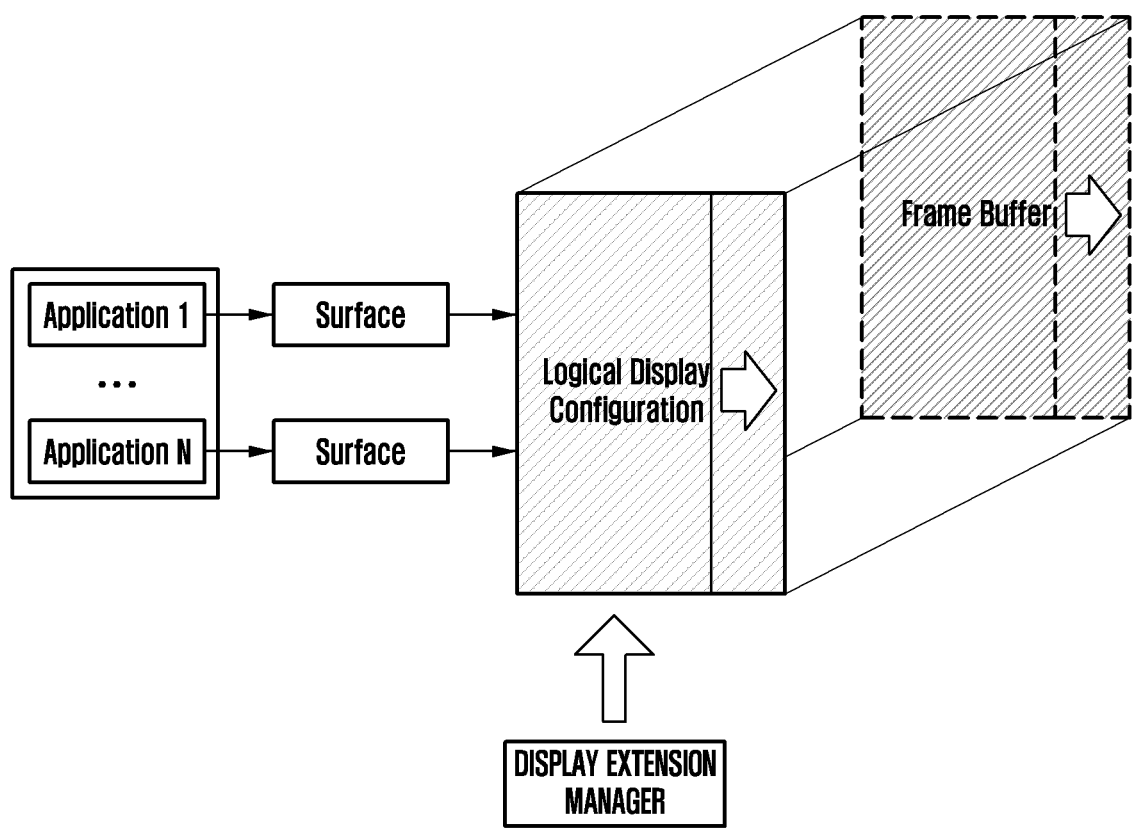

FIGS. 12 and 13 are diagrams illustrating a size of a logical display and a frame buffer area according to sliding of a display according to certain embodiments.

Specifically, FIG. 12 illustrates a size of a logical display and an area of a frame buffer according to slide-in of the display, and FIG. 13 illustrates a size of a logical display and an area of a frame buffer according to slide-out of the display.

According to an embodiment, an event of slide-in or slide-out of the display may occur. The processor of the electronic device may calculate and map an area of the logical display. The processor may update display configurations including display area information on the physical display. When the configuration of the physical display is changed, the processor may change the configuration of the logical display, and request an application to change a resolution and density based on the changed configuration of the logical display. The processor may calculate a frame buffer area with reference to displayable area information of the physical display.

An electronic device according to certain embodiments of the disclosure includes a sensor module, a flexible display, and a processor operatively connected to the sensor module and the flexible display, wherein the processor may measure a first position of the flexible display using the sensor module, thereby resulting in a measured first position value, measure a second position of the flexible display using the sensor module based on a movement of the flexible display, thereby resulting in a measured first position value, determine a movement change amount of the flexible display using a measured first position value and a measured second position value, thereby resulting in a determined movement change, correct the measured second position value using a threshold based on the determined movement change amount of the flexible display, thereby resulting in a corrected second position value, and display a screen based on the corrected second position value.

When it is determined that the change amount in movement of the flexible display increases, the processor of the electronic device according to certain embodiments of the disclosure may increase the threshold from a previously calculated movement change amount.

When it is determined that the change amount in movement of the flexible display decreases, the processor of the electronic device according to certain embodiments of the disclosure may decrease the threshold from a previously calculated movement change amount.

When a difference between the measured first position value and the measured second position value is greater than a minimum threshold, the processor of the electronic device according to certain embodiments of the disclosure may correct the measured second position value.

When a difference between the measured first position value and the measured second position value is greater than a maximum threshold, the processor of the electronic device according to certain embodiments of the disclosure may correct the second position value using the maximum threshold.

In the electronic device according to certain embodiments of the disclosure, the threshold may be determined by at least one of a type of the sensor module, a method of the sensor module, sensitivity of the sensor module, or a specification of the sensor module.

In the electronic device according to certain embodiments of the disclosure, the threshold may be determined by at least one of a size of the flexible display, a user setting, or a resolution.

The processor of the electronic device according to certain embodiments of the disclosure may determine a moving angle of the flexible display using the measured first position value and the measured second position value and further correct the measured second position value using a threshold based on the determined moving angle of the flexible display.

The sensor module of the electronic device according to certain embodiments of the disclosure may include at least one of a contact sensor, an infrared (IR) sensor, a time of flight (TF) sensor, a non-contact sensor, or a magnetic force sensor.

In the electronic device according to certain embodiments of the disclosure, the threshold may be stored as a lookup table.

A method of operating an electronic device according to certain embodiments of the disclosure may include measuring a first position of a flexible display using a sensor module, thereby resulting in a measured first position value, measuring a second position of the flexible display using the sensor module based on the movement of the flexible display, thereby resulting in a measured second position value, determining a movement change amount of the flexible display using the measured first position value and the measured second position value, thereby resulting in a determined movement value, correcting the measured second position value using a threshold based on the determined movement change amount of the flexible display, thereby resulting in a corrected second position value, and displaying a screen based on the corrected second position value.

The method of operating an electronic device according to certain embodiments of the disclosure may further include increasing the threshold when it is determined that the movement change amount of the flexible display increases.

The method of operating an electronic device according to certain embodiments of the disclosure may further include decreasing the threshold when it is determined that the movement change amount of the flexible display decreases from a previously calculated movement change amount.

In the method of operating an electronic device according to certain embodiments of the disclosure, correcting the measured second position value may include an operation performing when a difference between the measured first position value and the measured second position value is greater than a minimum threshold from a previously calculated movement change amount.

In the method of operating an electronic device according to certain embodiments of the disclosure, correcting the measured second position value may include correcting, when a difference between the measured first position value and the measured second position value is greater than a maximum threshold, the second position value using the maximum threshold.

In the method of operating an electronic device according to certain embodiments of the disclosure, the threshold may be determined by at least one of a type of the sensor module, a method of the sensor module, sensitivity of the sensor module, or a specification of the sensor module.

In the method of operating an electronic device according to certain embodiments of the disclosure, the threshold may be determined by at least one of a size of the flexible display, a user setting, or a resolution.

The method of operating an electronic device according to certain embodiments of the disclosure may further include determining a moving angle of the flexible display using the measured first position value and the measured second position value, and correcting the measured second position value using a threshold based on the determined moving angle of the flexible display.

In the method of operating an electronic device according to certain embodiments of the disclosure, the sensor module may include at least one of a contact sensor, an infrared (IR) sensor, a time of flight (TF) sensor, a non-contact sensor, or a magnetic force sensor.

In the method of operating an electronic device according to certain embodiments of the disclosure, the threshold may be stored as a lookup table.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, The module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a sensor module;
a flexible display; and
a processor operatively connected to the sensor module and the flexible display,
wherein the processor is configured to:
measure a first position of the flexible display using the sensor module, thereby resulting in a measured first position value,
measure a second position of the flexible display using the sensor module based on a movement of the flexible display, thereby resulting in a measured second position value,
determine a change amount in movement of the flexible display using the measured first position value and a measured second position value, thereby resulting in a determined movement change,
correct the measured second position value using a threshold based on the determined movement change amount of the flexible display, thereby resulting in a corrected second position value, and
display a screen based on the corrected second position value.

2. The electronic device of claim 1, wherein the processor is configured to increase the threshold when it is determined that the movement change amount of the flexible display increases from a previously calculated movement change amount.

3. The electronic device of claim 1, wherein the processor is configured to decrease the threshold when it is determined that the movement change amount of the flexible display decreases from a previously calculated movement change amount.

4. The electronic device of claim 1, wherein the processor is configured to correct the measured second position value when a difference between the measured first position value and the measured second position value is greater than a minimum threshold.

5. The electronic device of claim 1, wherein the processor is configured to correct, when a difference between the measured first position value and the measured second position value is greater than a maximum threshold, the second position value using the maximum threshold.

6. The electronic device of claim 1, wherein the threshold is determined by at least one of a type of the sensor module, a method of the sensor module, sensitivity of the sensor module, or a specification of the sensor module.

7. The electronic device of claim 1, wherein the threshold is determined by at least one of a size of the flexible display, a user setting, or a resolution.

8. The electronic device of claim 1, wherein the processor is configured to:
determine a moving angle of the flexible display using the measured first position value and the measured second position value, and
further correct the measured second position value using a threshold based on the determined moving angle of the flexible display.

9. The electronic device of claim 1, wherein the sensor module comprises at least one of a contact sensor, an infrared (IR) sensor, a time of flight (TF) sensor, a non-contact sensor, or a magnetic force sensor.

10. The electronic device of claim 1, wherein the threshold is stored as a lookup table.

11. A method of operating an electronic device, the method comprising:
measuring a first position of a flexible display using a sensor module, thereby resulting in a measured first position value;
measuring a second position of the flexible display using the sensor module based on a movement of the flexible display, thereby resulting in a measured second position value;
determining a movement change amount of the flexible display using the measured first position value and a measured second position value, thereby resulting in a determine movement change;
correcting the measured second position value using a threshold based on the determined movement change amount of the flexible display, thereby resulting in a corrected second position value; and
displaying a screen based on the corrected second position value.

12. The method of claim 11, further comprising increasing the threshold when it is determined that the movement change amount of the flexible display increases from a previously calculated movement change amount.

13. The method of claim 11, further comprising decreasing the threshold when it is determined that the movement change amount of the flexible display decreases from a previously calculated movement change amount.

14. The method of claim 11, wherein correcting the measured second position value comprises an operation performing when a difference between the measured first position value and the measured second position value is greater than a minimum threshold.

15. The method of claim 11, wherein correcting the measured second position value comprises correcting, when a difference between the measured first position value and the measured second position value is greater than a maximum threshold, the second position value using the maximum threshold.

16. The method of claim 11, wherein the threshold is determined by at least one of a type of the sensor module, a method of the sensor module, sensitivity of the sensor module, or a specification of the sensor module.

17. The method of claim 11, wherein the threshold is determined by at least one of a size of the flexible display, a user setting, or a resolution.

18. The method of claim 11, further comprising:
determining a moving angle of the flexible display using the measured first position value and the measured second position value; and
correcting the measured second position value using a threshold based on the determined moving angle of the flexible display.

19. The method of claim 11, wherein the sensor module comprises at least one of a contact sensor, an infrared (IR) sensor, a time of flight (TF) sensor, a non-contact sensor, or a magnetic force sensor.

20. The method of claim 11, wherein the threshold is stored as a lookup table.

* * * * *